US009313718B2

(12) United States Patent
Lee

(10) Patent No.: US 9,313,718 B2
(45) Date of Patent: Apr. 12, 2016

(54) METHOD AND APPARATUS FOR COOPERATIVE DISCOVERY AND IN PROXIMITY-BASED SERVICE

(71) Applicant: LG ELECTRONICS INC., Seoul (KR)

(72) Inventor: Ki-Dong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 14/386,677

(22) PCT Filed: Apr. 11, 2013

(86) PCT No.: PCT/KR2013/003038
§ 371 (c)(1),
(2) Date: Sep. 19, 2014

(87) PCT Pub. No.: WO2013/154362
PCT Pub. Date: Oct. 17, 2013

(65) Prior Publication Data

US 2015/0049635 A1 Feb. 19, 2015

Related U.S. Application Data

(60) Provisional application No. 61/623,048, filed on Apr. 11, 2012, provisional application No. 61/645,002, filed on May 9, 2012.

(51) Int. Cl.
*H04W 48/14* (2009.01)
*H04W 8/00* (2009.01)
(Continued)

(52) U.S. Cl.
CPC .............. *H04W 48/14* (2013.01); *H04W 4/023* (2013.01); *H04W 4/206* (2013.01); *H04W 8/005* (2013.01); *H04W 40/02* (2013.01)

(58) Field of Classification Search
None
See application file for complete search history.

(56) References Cited

U.S. PATENT DOCUMENTS 8,140,011 B2 * 3/2012 Kawakami ............ H04L 45/122 455/11.1
8,619,631 B2 * 12/2013 Matsuo .................. H04L 45/00 370/255

(Continued)

OTHER PUBLICATIONS

Ahmed, et al., "Resource and Service Discovery in Large-Scale Multi-Domain Networks," IEEE communications 4th Quarter 2007, vol. 9, No. 4, 29 pages.

(Continued)

*Primary Examiner* — Hong Cho
(74) *Attorney, Agent, or Firm* — Lee, Hong, Degerman, Kang & Waimey PC; Jonathan Kang; Justin Lee

(57) ABSTRACT

The present invention is directed to a method and an apparatus for use in a wireless communication system. Specifically, the present invention is directed to a method of assisting a discovery between hidden wireless nodes and an apparatus therefore, in which the method comprises: receiving, from a first wireless node, a first message including at least one of node identification information and service identification information; receiving, from a second wireless node, a second message including at least one of node identification information and service identification information; conveying, to the second wireless node, at least part of the first message through a third message when one or more conditions are met, wherein the third message includes counting information indicating how many hops the at least part of the first message is conveyed, wherein the one or more condition include that the service information in the first message is matched with the service information in the second message.

14 Claims, 19 Drawing Sheets

(51) Int. Cl.

*H04W 4/02* (2009.01)
*H04W 4/20* (2009.01)
*H04W 40/02* (2009.01)

(56) References Cited

U.S. PATENT DOCUMENTS 9,173,245 B2 * 10/2015 Bill ....................... H04L 12/581
2008/0019367 A1 * 1/2008 Ito ..................... H04L 29/12009 370/392
2008/0062945 A1 * 3/2008 Ahuja ................... H04W 8/005 370/342

OTHER PUBLICATIONS

Sun, et al., "Resource and Service Discovery in Wireless Ad-Hoc Networks With Agile Computing," IEEE 2006, 7 pages.
Haarman, "Ahoy: A Proximity-Based Discovery Protocol," University of Twente, Jan. 2007, 56 pages.
PCT International Application No. PCT/KR2013/003038, Written Opinion of the International Searching Authority dated Jul. 30, 2013, 1 page.

* cited by examiner (a)

| header | Ad | Ping | No. of Intermediate Notes | Time, location info | Others, CRC, etc. |
|---|---|---|---|---|---|

METHOD AND APPARATUS FOR COOPERATIVE DISCOVERY AND IN PROXIMITY-BASED SERVICE

CROSS-REFERENCE TO RELATED APPLICATIONS

This application is the National Stage filing under 35 U.S.C. 371 of International Application No. PCT/KR2013/003038, filed on Apr. 11, 2013, which claims the benefit of U.S. Provisional Application Ser. No. 61/623,048, filed on Apr. 11, 2012 and 61/645,002, filed on May 9, 2012, the contents of which are all hereby incorporated by reference herein in their entirety.

TECHNICAL FIELD

The present invention is directed to a method and an apparatus for use in a wireless communication system. Specifically, the present invention is directed to a method and an apparatus of cooperative discovery in proximity-based service.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently performing discovery procedures.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of assisting a discovery between hidden wireless nodes at a wireless device in a wireless communication system is provided, in which the method comprises: receiving, from a first wireless node, a first message including at least one of node identification information and service identification information; receiving, from a second wireless node, a second message including at least one of node identification information and service identification information; and conveying, to the second wireless node, at least part of the first message through a third message when one or more conditions are met, wherein the third message includes counting information indicating how many hops the at least part of the first message is conveyed, wherein the one or more condition include that the service information in the first message is matched with the service information in the second message.

As another aspect of the present invention, a wireless device configured to assist a discovery between hidden wireless nodes in a wireless communication system is provided, in which the wireless device comprises: a radio frequency (RF) unit; and a processor, wherein the processor is configured to: receive, from a first wireless node, a first message including at least one of node identification information and service identification information; receive, from a second wireless node, a second message including at least one of node identification information and service identification information; convey, to the second wireless node, at least part of the first message through a third message when one or more conditions are met, wherein the third message includes counting information indicating how many hops the at least part of the first message is conveyed, wherein the one or more condition include that the service information in the first message is matched with the service information in the second message.

Preferably, the one or more conditions may include that the wireless device obtains, from a network node, approval for conveying the at least part of the first message.

Preferably, the one or more conditions may include that the wireless device does not receive a forth message including at least one of node identification information and service identification information embedded in the first message or the second message.

Preferably, the first message may be a discovery related message including at least one of ping related information and advertisement related information, and the second message is a discovery related message including at least one of ping related information and advertisement related information.

Preferably, the third message may include time information related with reception time of the first message.

Preferably, the time information may indicate a time difference between current time and the reception time of the first message.

Preferably, the third message may include location information for a corresponding service.

Advantageous Effects

Exemplary embodiments of the present invention have the following effects. In accordance with the embodiments of the present invention, efficient discovery procedure is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 18 illustrates an example of message(s) to convey in accordance with the present invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
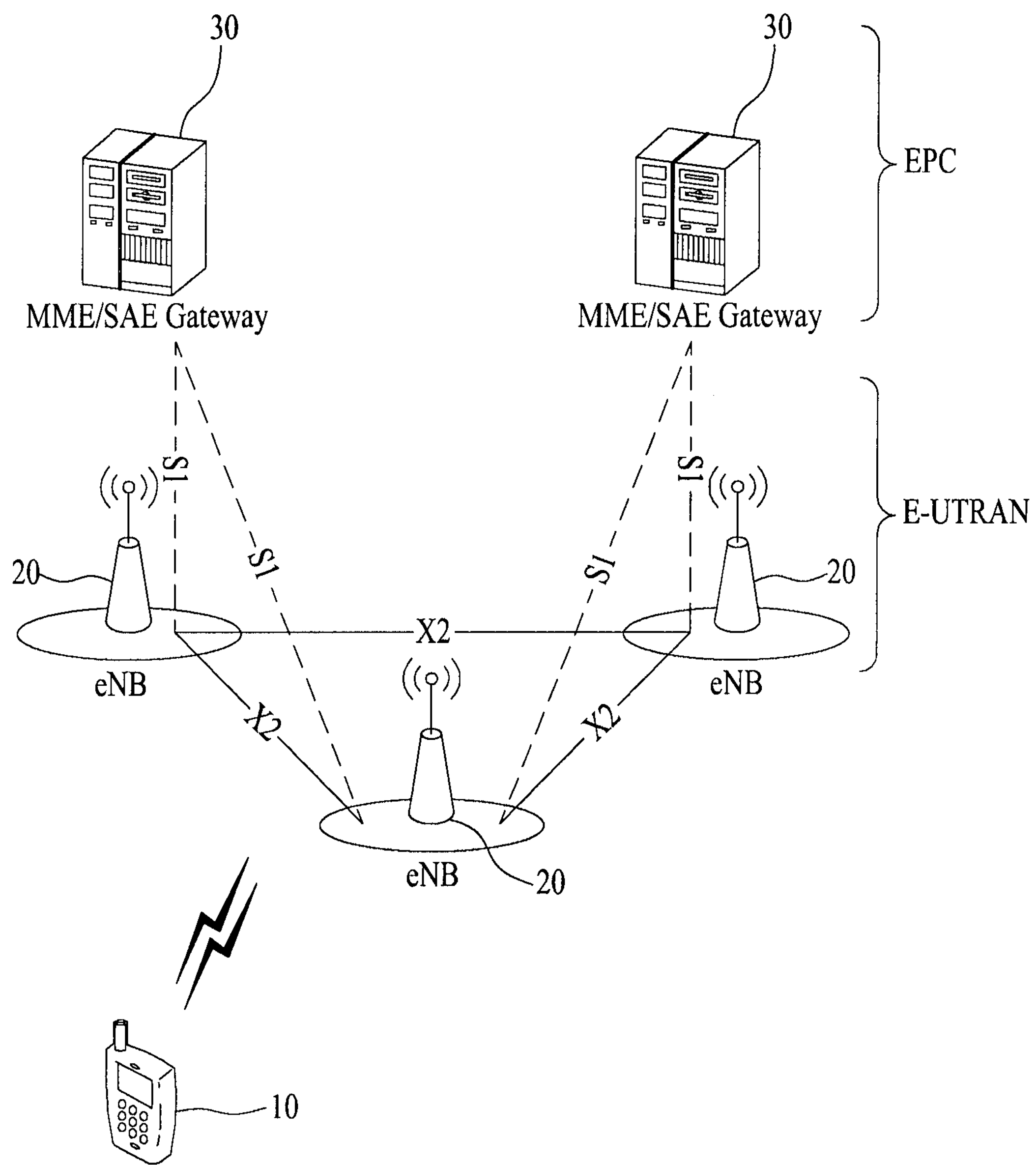
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
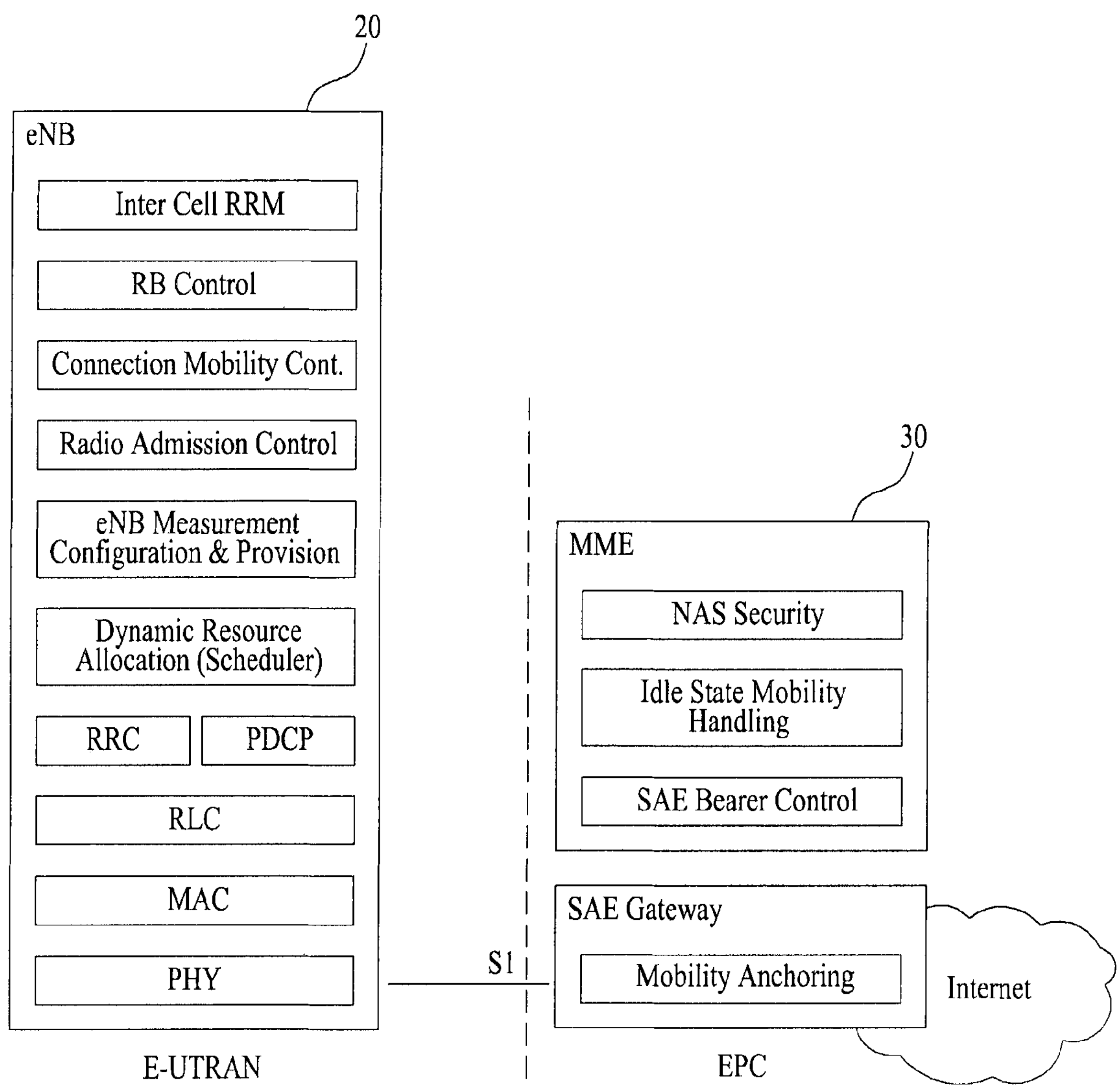
FIG. 2 illustrates a general structure of a typical E-UTRAN and that of a typical Evolved Packet Core (EPC).

FIG. 2 is a block diagram depicting general structures of an E-UTRAN and a EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
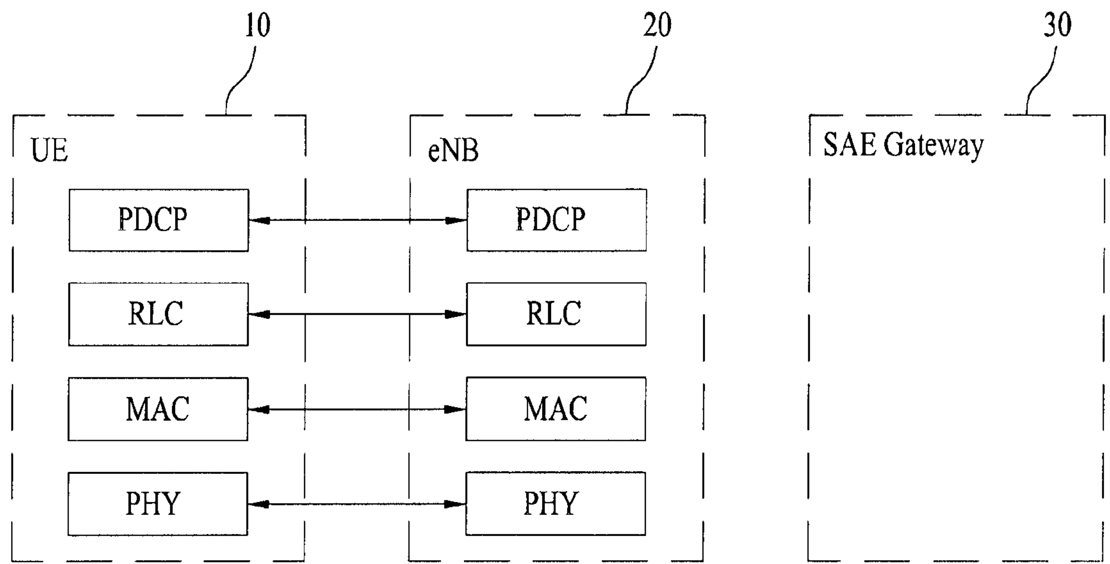
FIGS. 3*a*~3*b* illustrate a user-plane protocol and a control-plane protocol stack for the E-UMTS network
Figure 3B:
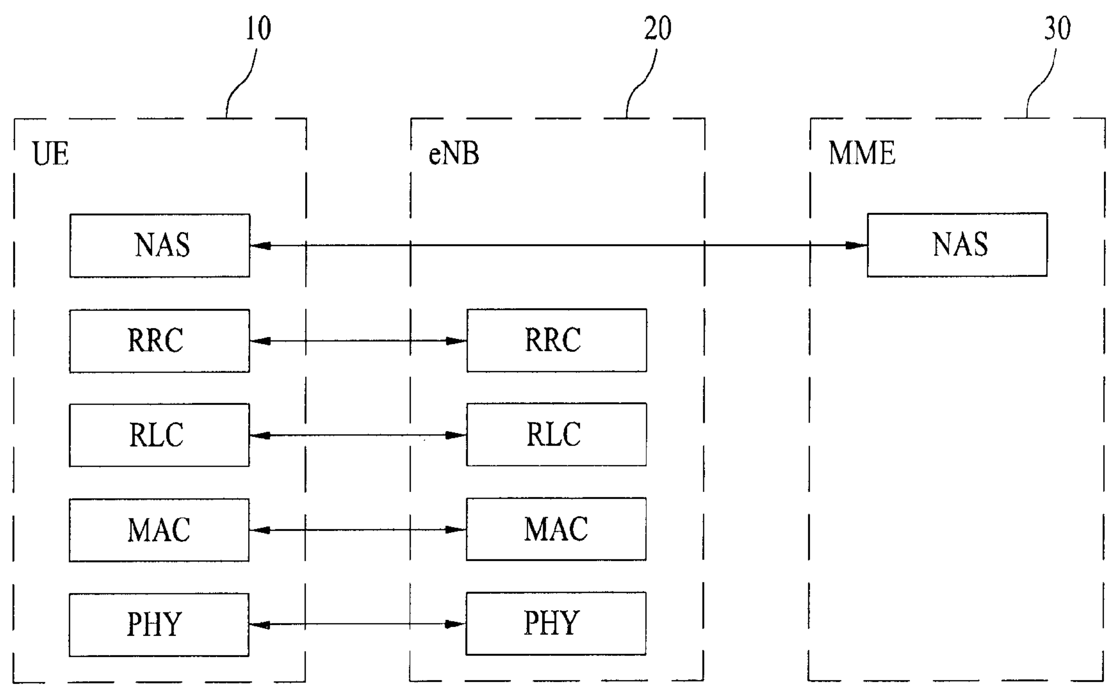

FIGS. 3*a*~3*b* illustrate the user-plane protocol and the control-plane protocol stack for the E-UMTS network. With reference to FIGS. 3*a*~3*b*, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3*a*~3*b* as being separate from the MAC layer, it is understood that the functions of the RLC layer may be performed by the MAC layer and that, therefore, a separate RLC layer is not required. With reference to FIG. 3*a*, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3*b*, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3*a*, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

With reference to FIG. 3*b*, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover) of the UE.

Figure 4:
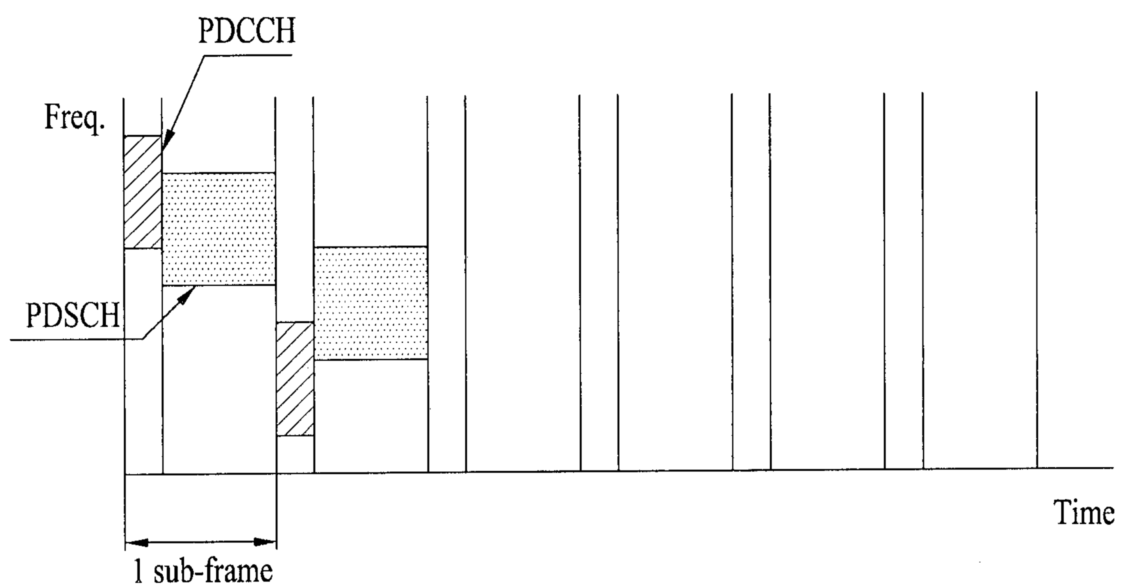
FIG. 4 illustrates a downlink subframe and physical channels.

FIG. 4 illustrates a downlink subframe and physical channels.

With reference to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

- A UE switches from power-off to power-on and needs to be registered to the network.
- A UE is not time-synchronized with a eNB and starts transmitting data (for instance the user calls).
- An eNB starts transmitting data to the UE but they are not synchronized (for instance the user receives a call).
- An eNB measures a delay of the received signal from the UE (for instance the user is moving and has lost synchronization).

Figure 5:
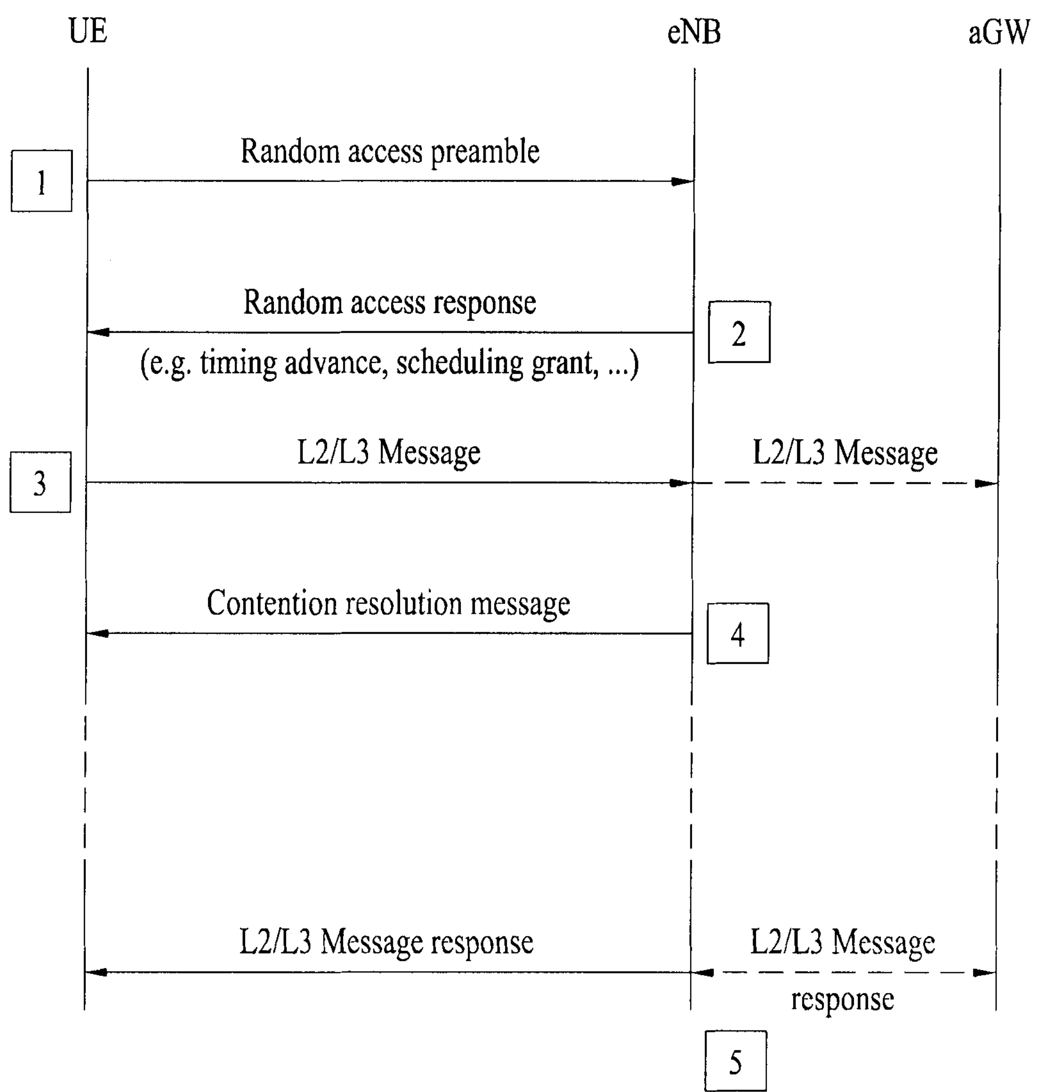
FIG. 5 illustrates a contention-based Random Access (RA) procedure.

FIG. 5 illustrates a contention-based random access procedure.

With reference to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to re-start the RACH procedure. If the UE was not in collision, the eNB sends a resource assignment message (message 5, box 5). Subsequent transmissions are carried out as usual.

Proximity-Based Service (ProSe)

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. The ProSe has various use cases and potential requirements for an operator network controlled discovery and communications between wireless devices that are in proximity, under continuous network control, and are under a 3GPP network coverage, for:

- Commercial/social use
- Network offloading
- Public Safety
- Integration of current infrastructure services, to assure the consistency of the user experience including reachability and mobility aspects
- Public Safety, in case of absence of EUTRAN coverage (subject to regional regulation and operator policy, and limited to specific public-safety designated frequency bands and terminals)

Figure 6:
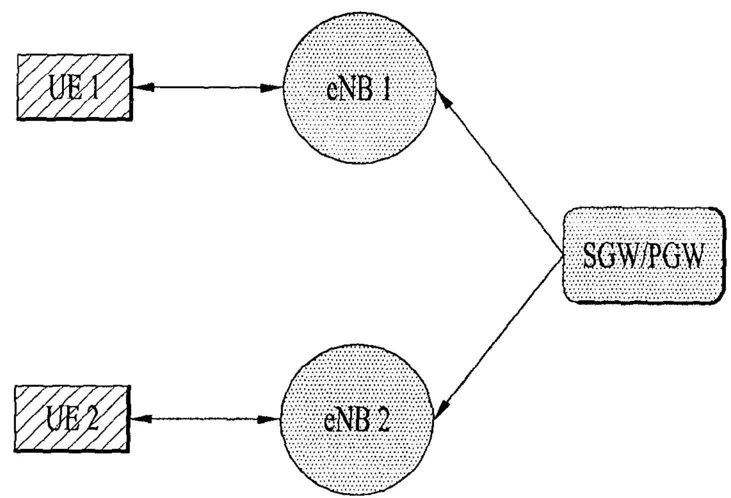
FIG. 6 illustrates an example of default data path for a normal communication.

FIG. 6 illustrates an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
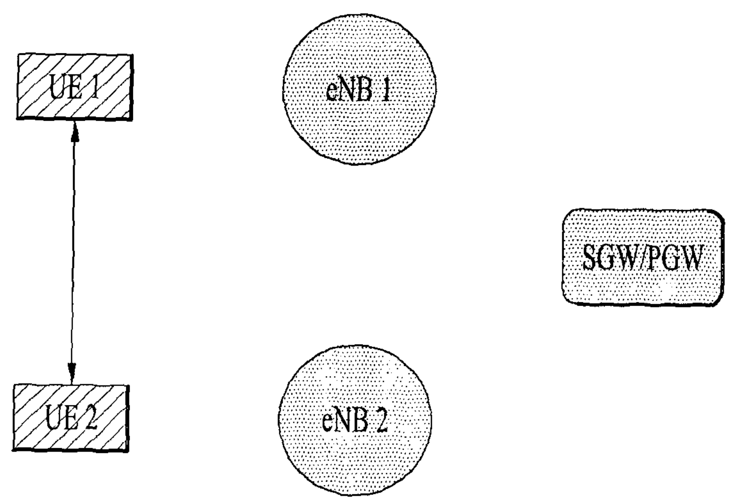
FIGS. 7~8 illustrate examples of data path scenarios for a proximity communication.
Figure 8:
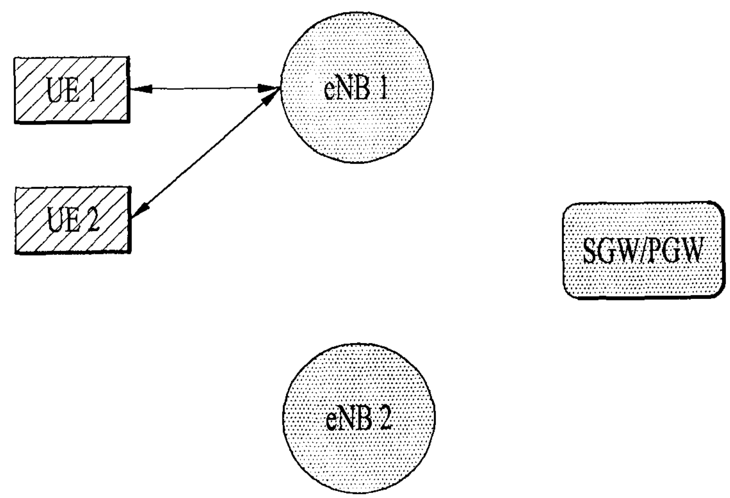

FIGS. 7~8 illustrate examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
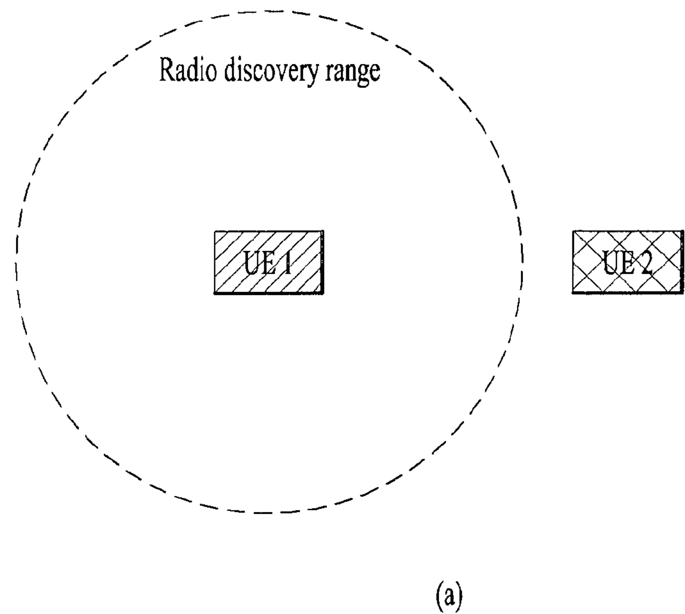
FIG. 9 illustrates concept of a cooperative discovery.
Figure 9:
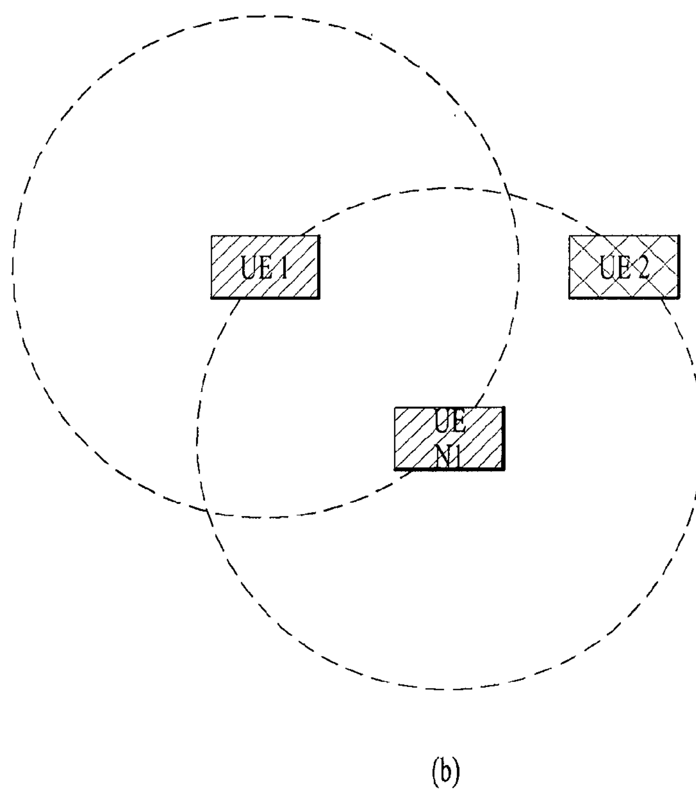

FIG. 9 illustrates concept of a cooperative discovery. If the Provider Node (PN) (e.g., UE2) of a certain service and the Seeker Node (SN) (e.g., UE1) of the service are not within a discovery range, the SN cannot discover the existence of the PN directly until it will be located within the (radio) proximity region of SN (or vice versa) (FIG. 9(*a*)). That is, UE2 (Provider Node of a certain service) is out of the (radio) discovery range of UE1 (Seeker Node of a certain service). UE1 cannot identify the existence of UE2 until UE2 is within its own (radio) discovery range. However, if there exists (at least) one Intermediate Neighboring Node (INN) between the PN and SN, it can help either of or both PN and SN discover the other in an efficient way. which is called as cooperative discovery (FIG. 9(*b*)). In particular, UE2 is out of the (radio) discovery range of UE1, thus UE1 cannot identify the existence of UE2 directly but UE N1 (neighbor node 1) can help UE1 find UE2. The cooperative discovery can save monitoring time-span and energy consumption, more importantly, improves the quality of user experience.

FIGS. 10~17 illustrate examples of proposed cooperative discovery in accordance with the present invention. Some operations for the proposed cooperative discovery are repeated in the examples. In order to help understanding of the present invention, repetitive explanations may be omitted, and explanations on different features will be mainly described.

Figure 10:
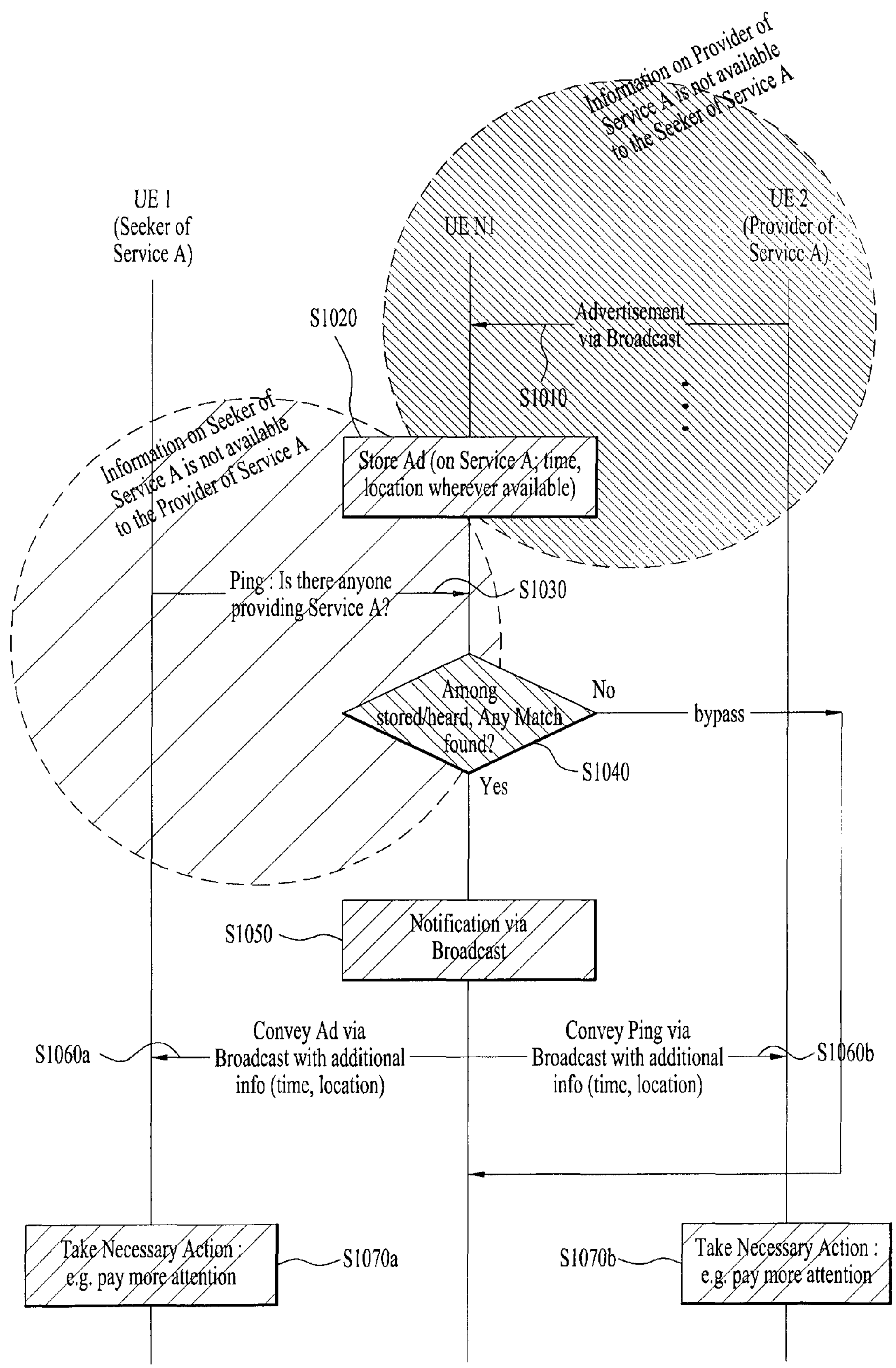
FIGS. 10~17 illustrate examples of cooperative discovery in accordance with the present invention.

FIG. 10 illustrates an example of the proposed cooperative discovery. With reference to FIG. 10, it is assumed that information on a Provider Node (PN) (UE2) of service A is not available to a Seeker Node (SN) (UE1) of service A, and information on the SN (UE1) of service A is not available to the PN (UE2) of service A. Thus, the PN (UE2) may broadcast Advertisement (Ad) information for service A (S1010), but the SN (UE1) cannot hear it. Also, the SN (UE2) may send ping information for service A (S1030), but the PN (UE2) cannot hear it. Here, the Ad information may be used to provide one or more information related with a PN and/or a usable service (e.g., service A). For example, the Ad information may include at least one of PN identification information (e.g., PN name, PN ID., etc.), service identification information (e.g., service name, service ID, service type, etc.), service usability/restriction information (service time, service location, etc.). The ping information may be used to query PNs about "is there anyone providing a service of interest (e.g., service A)". The ping information may include one or more information related with a SN and/or a service of interest (e.g., service A). For example, the ping information may include at least one of SN identification information (e.g., SN name, SN ID., etc.), service identification information (e.g., service name, service ID, service type, etc.).

B if there is an Intermediate Neighboring Node (INN) (UE N1), INN (UE N1) can hear both the Ad information (S1010) and the ping information (S1030). For a purpose of explanation, it is assumed in FIG. 10 that INN (UE N1) hears the Ad information (S1010) and then hears the ping information (S1030) (reception orders of the Ad information and the ping information can be changed like FIGS. 13, 14 and 17). In this case, INN (UE N1) may store the Ad information (e.g., service name, service ID, service type, service time, service location) for service A upon receipt of the Ad information (S1020). With the Ad information, INN (UN N1) may also store reception time/location of the Ad information from PN (UE2). Then, INN (UE N1) may receive the ping information (e.g., service name, service ID, service type) for a service (S1030). In this case, INN (UE N1) may also store the ping information for the service. With the ping information, INN (UE N1) may also store reception time/location of the ping information from SE (UE1).

Then, if there is any matched information between the stored Ad information and the stored ping information (S1040), INN (UE N1) may notify nearby PN(s) of existence of SN(s) and notify SN(s) of existence of PN(s) (S1050). Specifically, INN (UE N1) may convey, for nearby SN(s), a message including the matched Ad information and additional information (e.g., reception time/location of the Ad information) via a broadcast channel (S1060*a*). In addition, INN (UE N1) may convey, for nearby PN(s), a message including the matched ping information and additional information (e.g., reception time/location of the ping information) via a broadcast channel (S1060*b*). The Ad and ping information may be included in the same message.

Operations of INN (UE N1) may be controlled by a network (node) (e.g., a base station, a MME, a ProSE-related server), the SN or the PN. For example, the network (node) may transmit configuration information to INN (UE N1), in which the configuration information may be used to indicate whether discovery of neighboring node(s) is allowed or not (e.g., whether hearing Ad information and/or ping information is allowed or not). Alternatively, the network (node) may notify INN (UE N1) of whether INN (UE N1) is an area of ProSe or not. If INN (UE N1) is notified that it is in an area of ProSe, INN (UE N1) may perform proposed operations for cooperative discovery. Otherwise, INN (UE N1) may not hear any Ad information and ping information for cooperative discovery. Alternatively, Ad information and/or ping information may include information for controlling the cooperative discovery, for example, conveyance allowance information (e.g., 1-bit flag), a total number of allowed conveyances/hops.

Meanwhile, even though the stored Ad information matches with the stored ping information, if there is significant difference(s) between reception times and/or locations of the Ad information and the ping information, it is useless to convey a message(s) including at least one the Ad information and the ping information. Thus if difference(s) between reception times and/or locations of the Ad information and the ping information is larger than a predetermined value, INN (UE N1) may not convey the message including at least one of the Ad information and the ping information (e.g. may drop transmission of the Ad information and the ping information). Also, the stored Ad and/or ping information can be flushed from buffer(s) of INN (UE N1), for example, when INN (UE N1) is signaled that it is out of an area of ProSe, when a certain time has been passed from the reception time of the Ad information and/or the ping information, when difference of current location of INN (UE N1) and the reception location of the Ad information and/or the ping information is larger than a predetermined value.

When SN (UE1) receives the conveyed message from INN (UE N1), SN (UE1) may pay more attention to discover PN (UE2) since the conveyed message implies that PN (UE2) may be located nearby (S1070*a*). In particular, SN (UE1) may increase transmission power of the ping information, decrease transmission interval of the ping information, decrease monitoring interval of the Ad information. However, if the time and/or location information in the conveyed message shows significant difference from a current time and/or location of SN (UE1), SN (UE1) may ignore the conveyed message and perform normal operations. Similarly, when PN (UE2) receives the conveyed information from INN (UE N1), PN (UE2) may pay more attention to discover SN (UE1) since the conveyed message implies that SN (UE1) may be located nearby (S1070*a*). In particular, PN (UE2) may increase transmission power of the Ad information, decrease transmission interval of the Ad information, decrease monitoring interval of the ping information. However, if the time and/or location information in the conveyed message shows significant difference from a current time and/or location of PN (UE2), PN (UE2) may ignore the conveyed message and perform normal operations. Alternatively, SN (UE1) and PN (UE2) may take some necessary action to save the monitoring time-span and energy consumption, more importantly, improve the quality of user experience.

Figure 11:
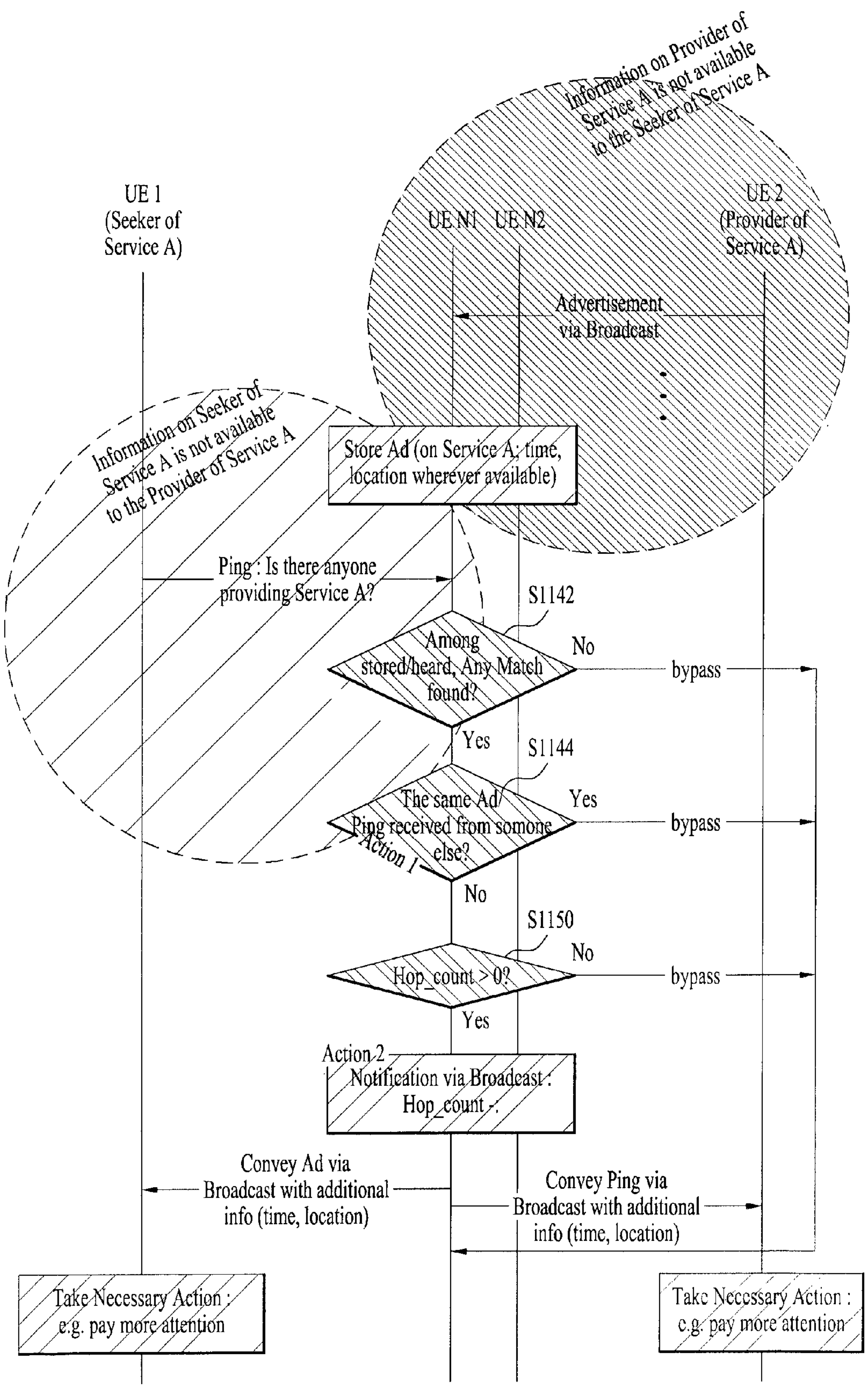
Figure 12:
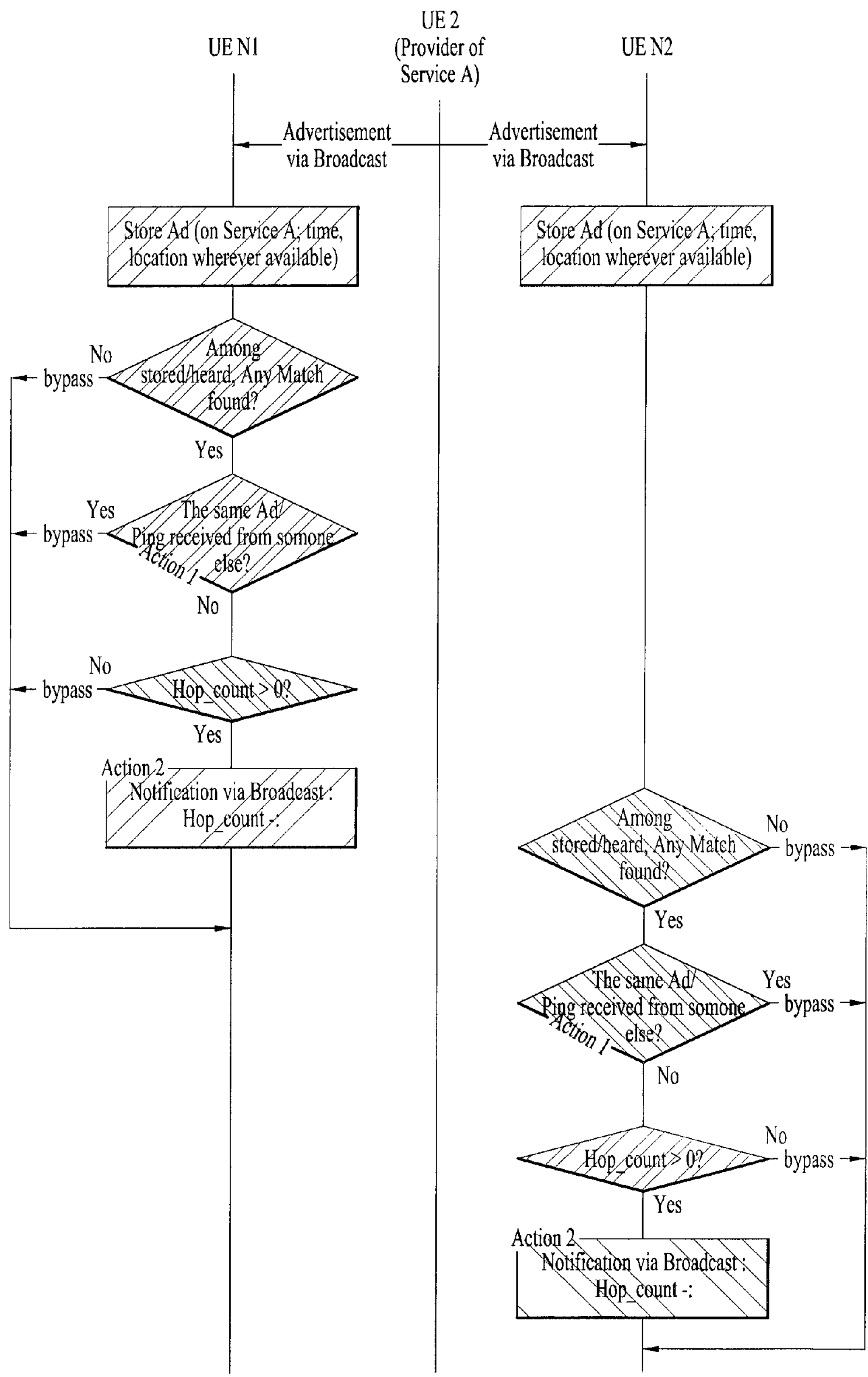

FIGS. 11~12 illustrate another example of the proposed cooperative discovery. FIGS. 11~12 are substantially identical with FIG. 10 except that plural Intermediate Neighboring Nodes (INNs) (e.g., UE N1, UE N2) may join in the proposed cooperative discovery. FIG. 11 illustrates overall procedures performed by SN, PN and INNs, and FIG. 12 illustrates partial procedures performed by INNs. Compared to FIG. 10, three steps (S1142, S1144 and S1150) are newly added or modified. In a situation that plural INNs join in the proposed cooperative discovery, an INN (e.g., UE N1) may receive Ad information and/or ping information from another INN (e.g., UE N2), not directly from SN (UE1) and/or PN (UE2). In that case, if there is no limit on how many hops the conveying message can go through or for how many seconds (or any measures in time) it can be going around, the conveying message may get around without being able to get to the destination. Thus it is proposed to limit how many hops the conveying message can go through or for how many seconds (or any measures in time) it can be going around, so that the conveying message can avoid getting around without being able to get to the destination. In addition, it may be preferable to skip conveying the message when the stored Ad information and/or the stored ping information are further received from another INN(s) since the message has been already broadcast by another INN(s).

Figure 13:
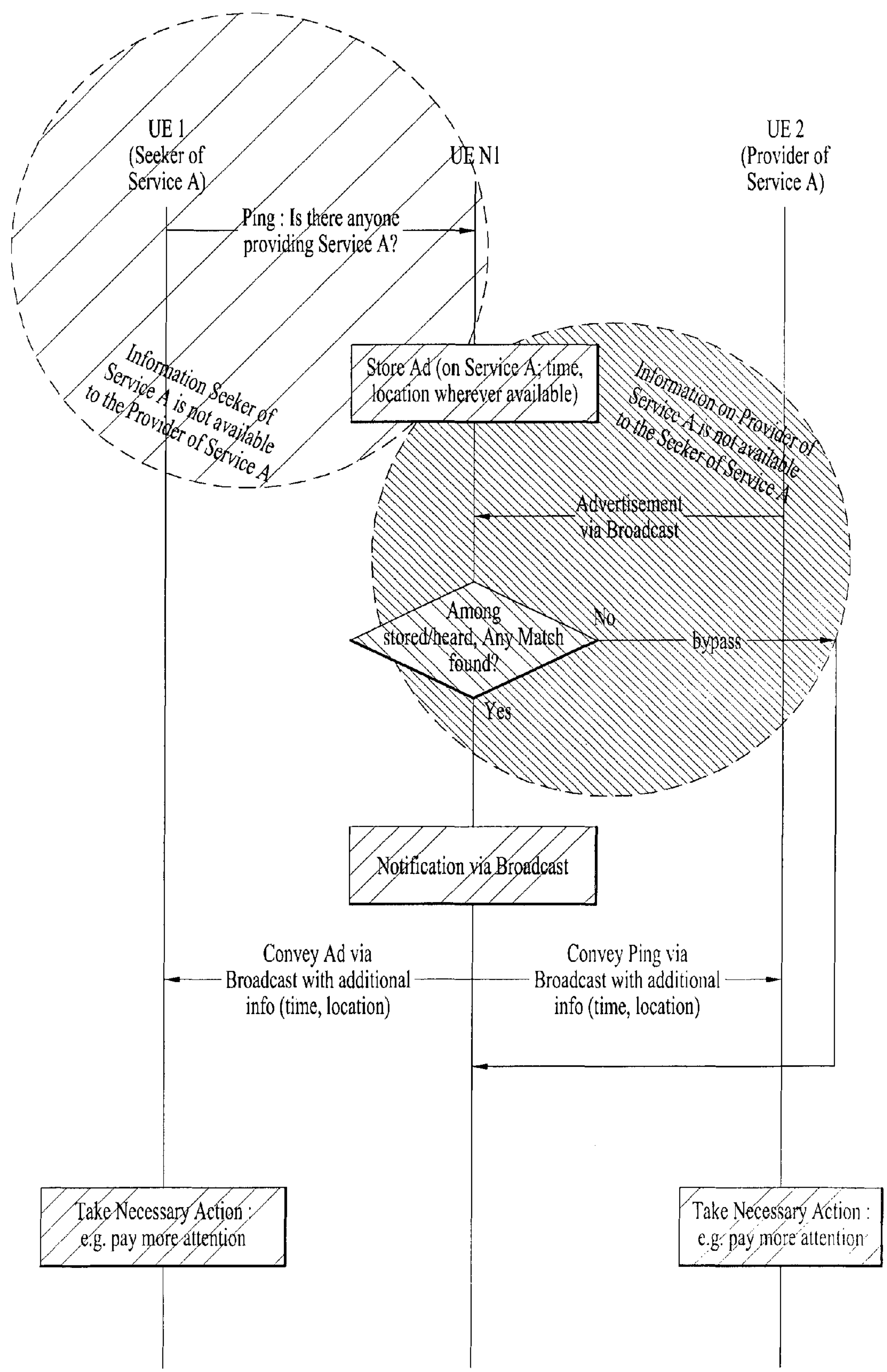
Figure 14:
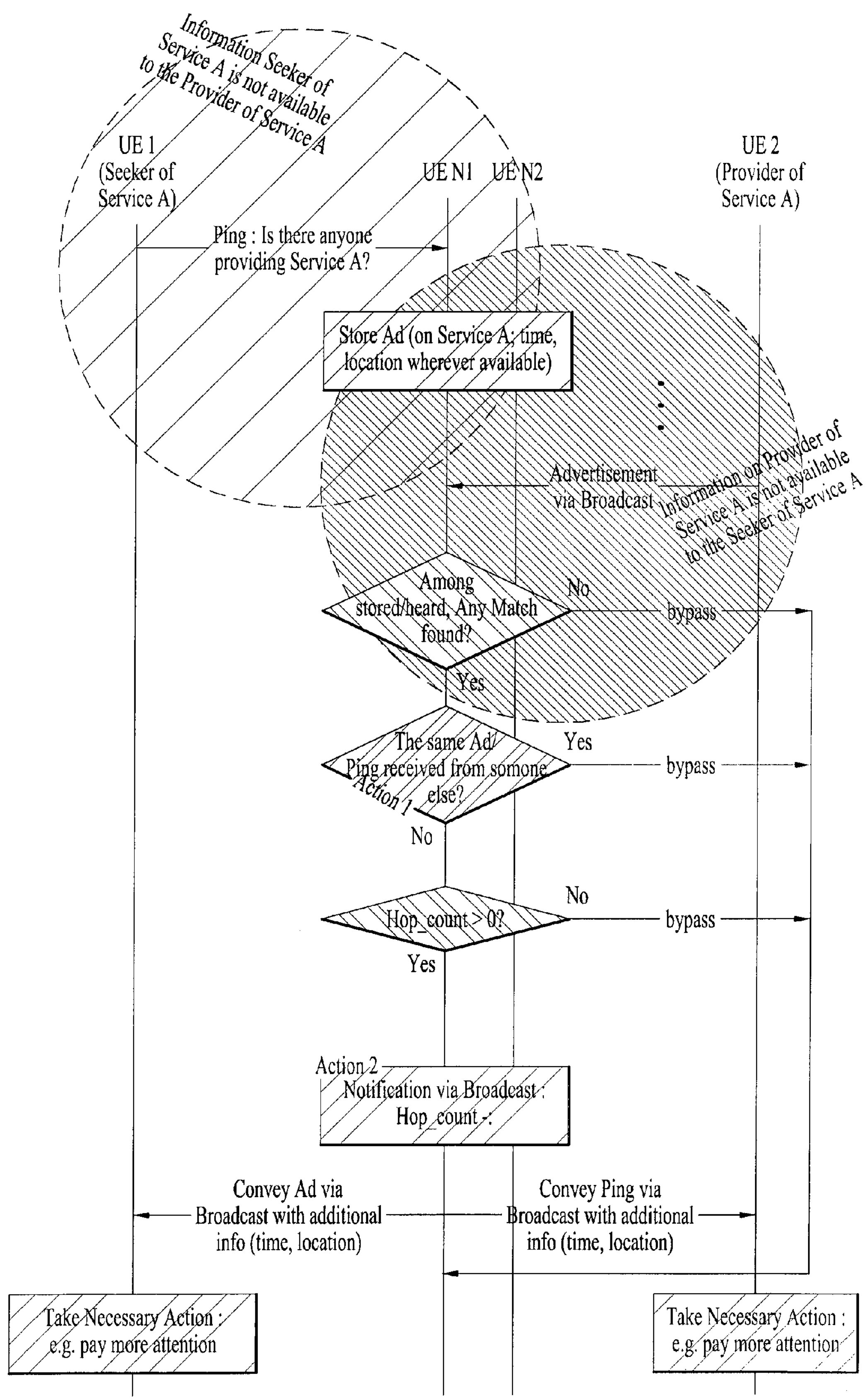

In particular, with reference to FIGS. 11~12, INN (UE N1) may check whether the stored Ad information and/or the stored ping information is further received from someone else (e.g., UE other than SN (UE1) and/or PN (UE2)) (action 1)(S1142). If the stored Ad information and/or the stored ping information are further received from someone else, conveying the message may be skipped. Otherwise, INN (UE N1) may check whether hop count (Hop_count) (in other words, the number of allowed conveyances/hops; alternatively, allowed time-span/duration) is larger than 0 (S1144). If the hop count is not larger than 0 (i.e., the hop count is 0), conveying the message may be also skipped. Meanwhile, if the hop count is larger than 0, INN (UE N1) may update the hop count to the current hop count−1, and convey the message(s) including at least one of the Ad information and the ping information (S1150). The PN and/or the SN may set-up the hop count (i.e., the number of hops allowed for conveying) when the PN and/or the SN attempts broadcast the Ad information and/or the ping information. The hop count may be set-up in a service-specific way or in a service-type-specific way. Or, for each service, the hop count may be set-up in consideration of a service type. For example, a service of "restaurant type" in a densely populated location is allowed only one time of conveying whereas a service of "hospital/clinic type" in a sparsely populated location is allowed to convey, e.g., up to three hops. Alternatively, INN (UE N1) may an inquiry to the PN/SN for the Action of Conveying FIGS. 13~14 illustrate another example of the proposed cooperative discovery. FIGS. 13~14 are substantially identical with FIGS. 10~11, except ping information is received earlier than Ad information at an INN. Detailed explanation can be referred to FIGS. 10~11.

Figure 15:
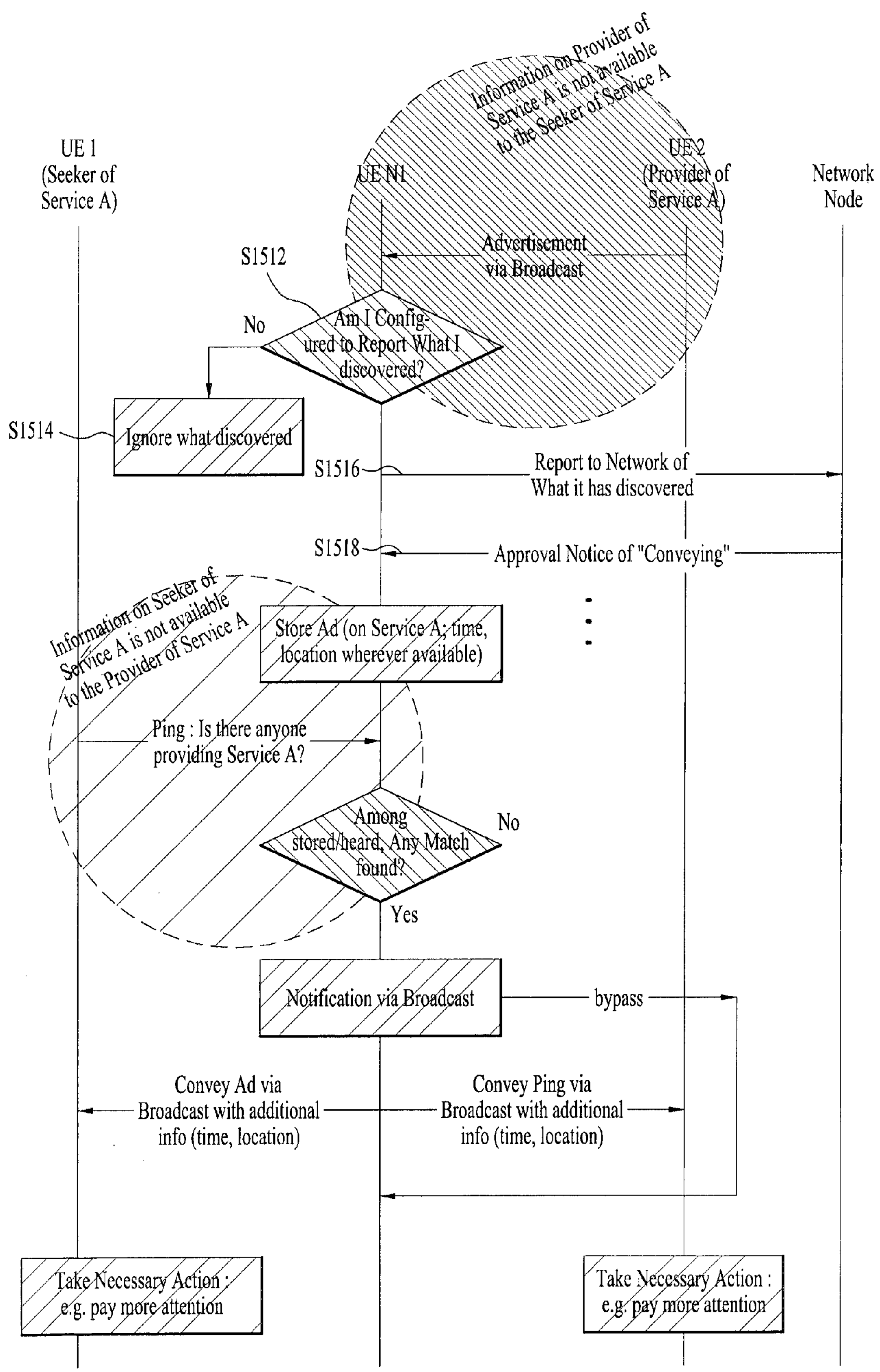
Figure 16:
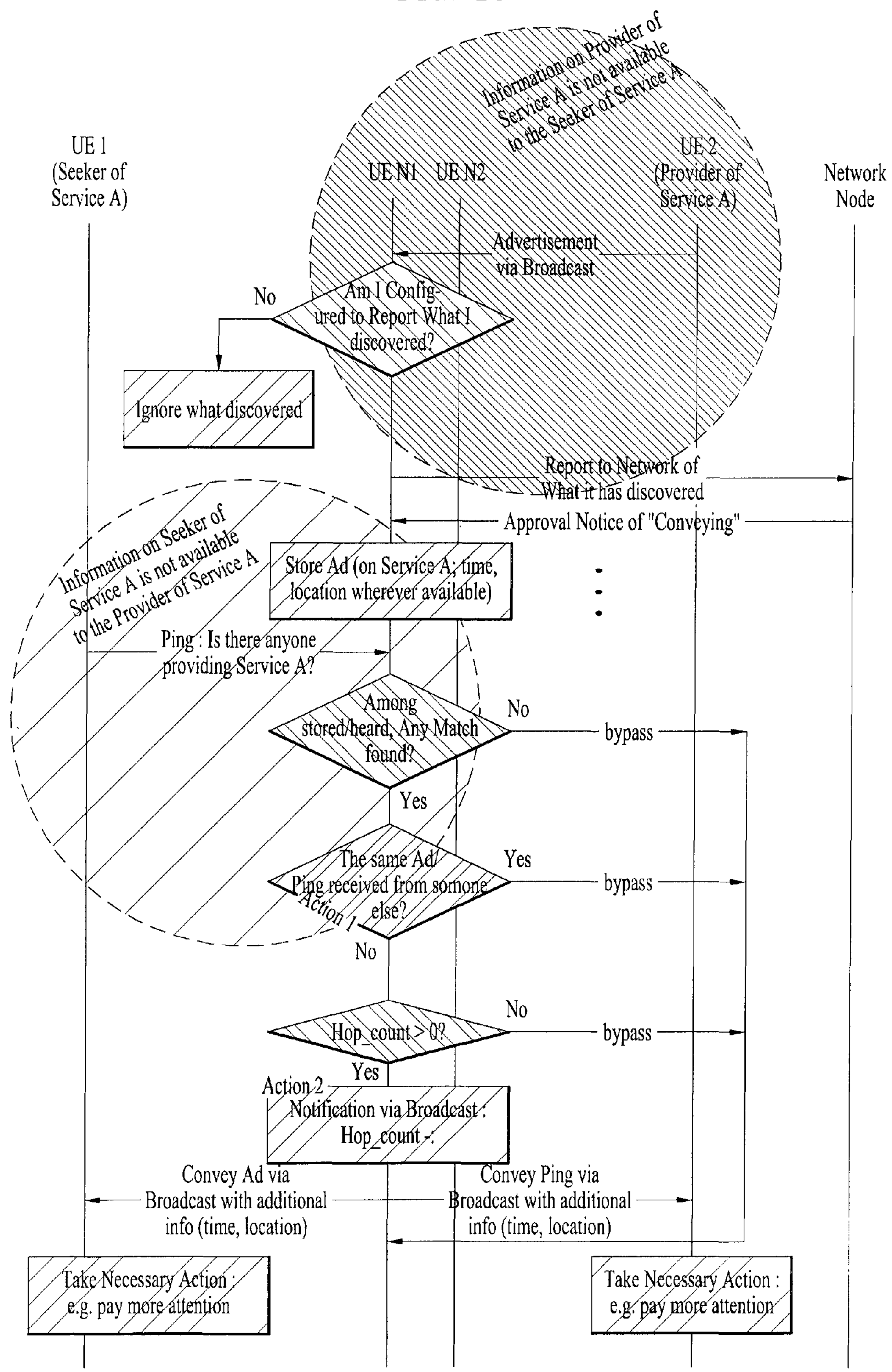
Figure 17:
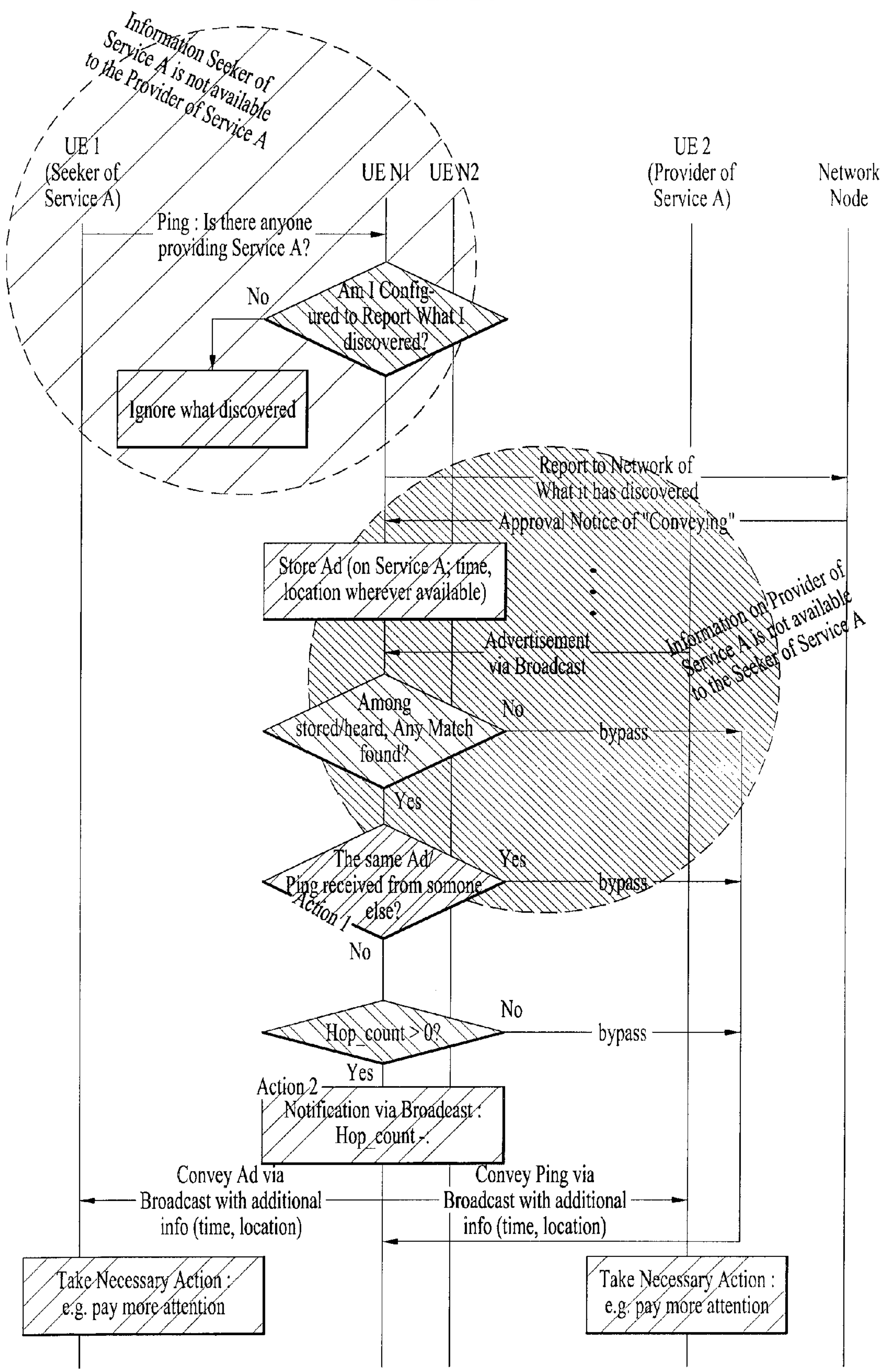

FIGS. 15~17 illustrate another example of the proposed cooperative discovery. FIGS. 15~17 are substantially identical with FIGS. 10, 11 and 14 except conveying a message is controlled by a network (node). For example, in a dense network condition (e.g., there are lots of INNs), cooperative discovery may cause unnecessary power consumption, radio resource waste, radio signal interference, and the like. It may be thus preferable for the network (node) (e.g., a base station, MME, a ProSe-related server) to control which INN(s) joins in the proposed cooperative discovery. Since the network (node) is able to identify how INNs are distributed around SN(s) and PN(s), a network-controlled cooperative discovery may be advantageous in a dense network: Compared to FIGS. 10, 11 and 14, four steps (S1512, S1514, S1516 and S1518) are newly added. Detailed explanation can be referred to FIGS. 10, 11 and 14. Detailed explanation on the newly added steps is described below.

In particular, when INN (e.g., UE N1 or UE N2) discover a neighboring node, for example, by detecting any one of ping information, Ad information and a conveyed message, INN (UE N1 or UE N2) may check whether INN (UE N1 or UE N2) is configured to report what INN (UE N1 or UE N2) discovered (S1512). If INN (UE N1 or UE N2) is configured not to report what INN (UE N1 or UE N2) has discovered, the proposed cooperative discovery is not performed (S1514). Meanwhile, if INN (UE N1 or UE N2) is configured to report what INN (UE N1 or UE N2) has discovered, INN (e.g., UE N1 or UE N2) may be able to send discovery information which it has found in its proximity, to the network (node) (S1516). With the reports from INN(s), the network (node) may be able to collect discovery information regarding which ProSe-enabled UEs have been discovered in the proximity of a given UE, thereby may decide permission of conveyance. Then, as a response to the report, if INN (UE N1 or UE N2) receives, from the network (node), a message including approval notice of conveying (S1518), INN (UE N1 or UE N2) may perform the proposed cooperative discovery. That is, if the network (node) allows INN (UE N1 or UE N2) to broadcast the discovery information to another unspecified UEs, the INN (UE N1 or UE N2) can perform broadcasting/conveying the discovery information based on the allowed number of hops. Otherwise, the proposed cooperative discovery is not performed.

For example, if the number of hops allowed is zero, no INN can convey the discovery information to another UE(s) even if network (node) allows to broadcast/convey the message including at least one of the Ad information and the ping information. And, if the number of hops allowed is one, the INN (UE N1 or UE N2) can convey the discovery information only once but cannot convey the discovery information of the same target node which was received from someone else other than the original target node since this information has already gone through one hop before UE N1 receives the conveyed information.

In brief, overall procedure of the proposed cooperative discovery and roles of each node can be summarized as follows:

1. PN (e.g., UE2) of a service transmits Ad information/message via a broadcast channel. The PN can specify (or digitally sign) that "Advertisement" is originally from him/herself, for example by using a certain ID (e.g., UE ID, service ID, etc.).

2. SN (e.g., UE1) of a service transmits ping information/message via a broadcast channel. The SN can specify (or digitally sign) that "Ping" is originally from him/herself, for example by using a certain ID (e.g., UE ID, service ID, etc.).

3. INN (e.g., UE N1 who overhears Ad information/ping information) conveys a message including at least one of Ad information and ping information. The INN can specify:

a) The time (or time difference from the current time instant, namely, how long before) it heard of that Ad information or Ping information.

b) The location (or difference from the current location, namely, how far from) it heard of that Ad information or Ping information.

c) The number of conveying Neighboring Nodes before him/herself: for example, if there is only one Neighboring Node between the PN and the SN, the Neighboring Node will specify zero in the "related field" of signaling message.

INN(s) can specify in the message to convey, information related with the time or location, or both, only if it hears from SN or PN (i.e., when "related field" is zero). The time and the location specify when and where the INN(s) heard of the Ad information from the PN or the ping information from the SN.

When the allowed number of hops is greater than one, the nodes at and after the second hop does not specify the time and location information.

4. Node (e.g., PN, SN) which receives the message conveyed by an INN (or multiple of them) can decrease the monitoring interval (because the message implies that the likelihood of the counterparty is supposed to be around or close to him/herself) or take some necessary action to save the monitoring time-span and energy consumption, more importantly, improve the quality of user experience. If the node is another INN, it may not convey the message, or may convey the message within an allowed time period or number of hops.

5. Conveying the message can be controlled by using following methods:

a) Coordinated method: a network (node) can limit (1) how many hops the conveying message can go through or (2) for how many seconds (or any measures in time) it can be going around, so that the message can avoid getting around without being able to get to the destination.

b) Distributed method: the SN or PN can set a maximum value (for time period or number of hops) so that the value can get decreased by one unit whenever it goes through one Intermediate Neighboring Node.

Figure 18:
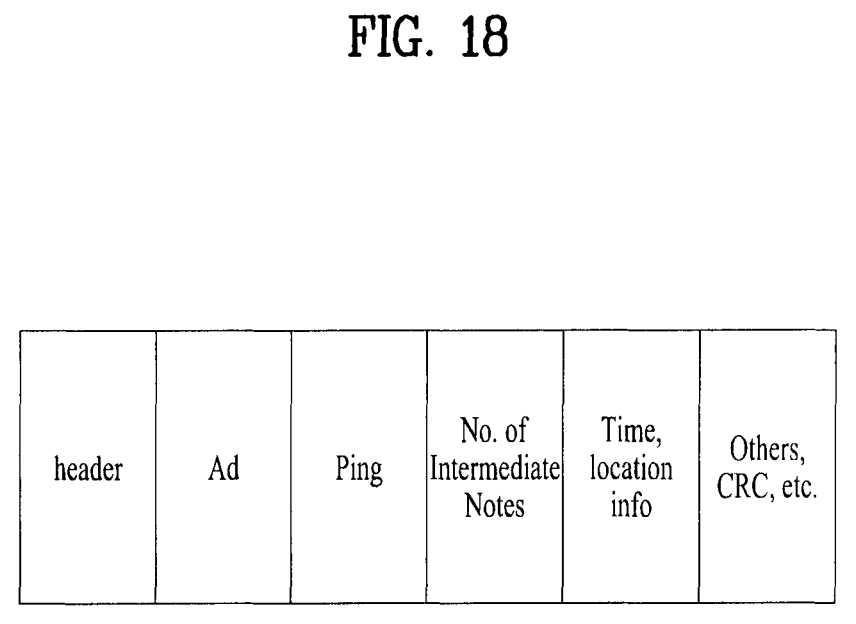

FIG. 18 illustrates an example of message(s) to convey in accordance with the present invention. With reference with FIG. 18, the message may include at least one of a header, Advertisement (Ad) information, ping information, the number of intermediate nodes, time/location information, other information (e.g., Cyclic Redundancy Check (CRC)). Contents of the message may be adaptively configured depending on which UE conveys the message. Ad information may be used to provide one or more information related with a PN and/or a usable service. For example, the Ad information may include at least one of PN identification information (e.g., PN name, PN ID., etc.), service identification information (e.g., service name, service ID, service type, etc.), service usability/restriction information (service time, service location, etc.). The ping information may be used to query PNs about "is there anyone providing a service of interest". The ping information may include one or more information related with a SN and/or a service of interest (e.g., service A). For example, the ping information may include at least one of SN identification information (e.g., SN name, SN ID., etc.), service identification information (e.g., service name, service ID, service type, etc.). The number of intermediate nodes is used to limit how many hops the message can go through or for how many seconds (or any measures in time) the message can be going around. The time information may indicate a time (or time difference from the current time instant, namely, how long before) 1st INN heard of that Ad information or Ping information. The location information may indicate a location (or difference from the current location, namely, how far from) it heard of that Ad information or Ping information.

Figure 19:
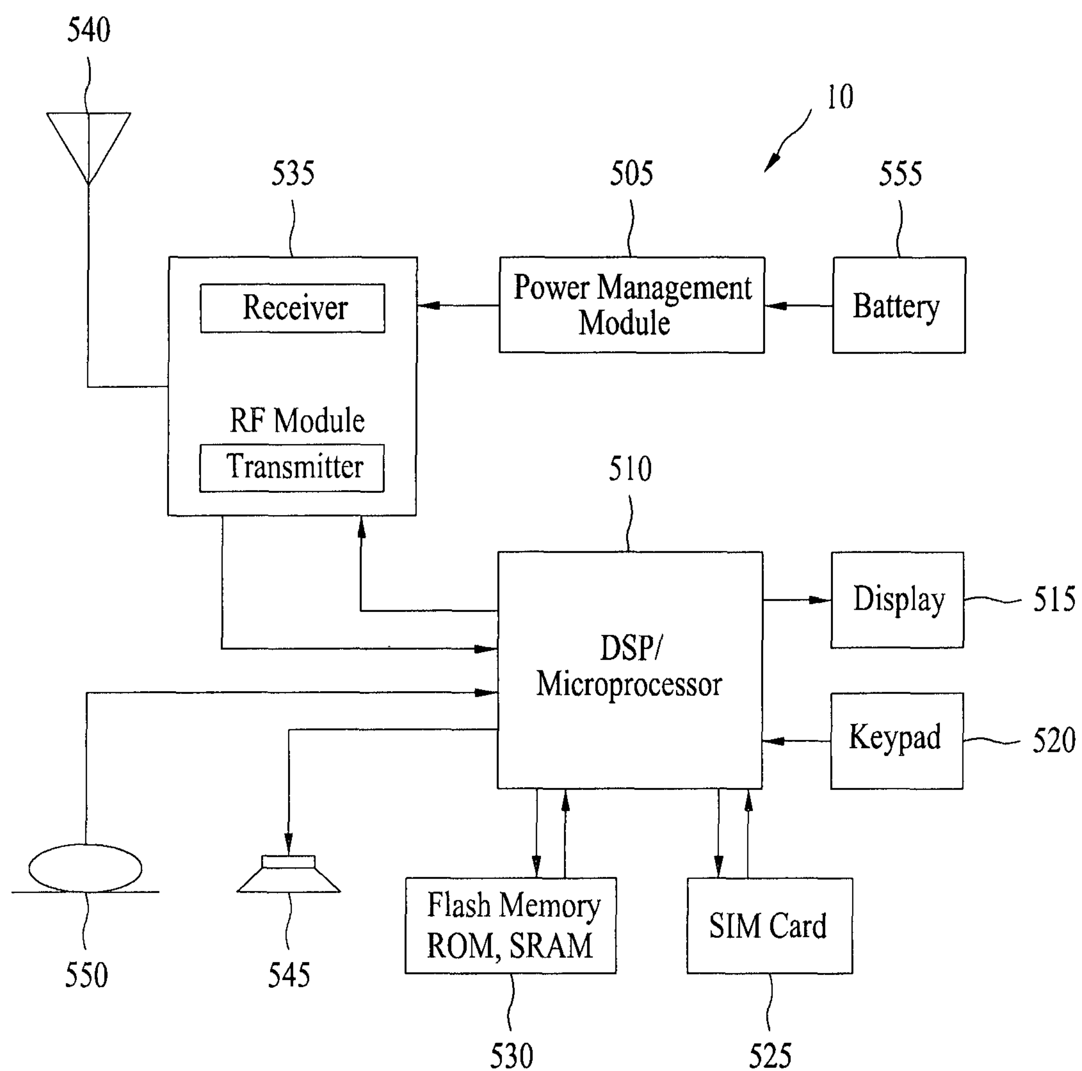
FIG. 19 illustrates a block diagram of a UE or Mobile Station (MS).

FIG. 19 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery for the proximity-based service.

The invention claimed is:

1. A method of assisting a discovery between hidden wireless nodes at a wireless device in a wireless communication system, the method comprising:

receiving, from a first wireless node, a first message including at least one of node identification information and service identification information;

receiving, from a second wireless node, a second message including at least one of node identification information and service identification information;

conveying, to the second wireless node, at least part of the first message through a third message when one or more conditions are met, wherein the third message includes counting information indicating how many hops the at least part of the first message is conveyed, wherein the one or more condition include that the service information in the first message is matched with the service information in the second message.

2. The method of claim 1, wherein the one or more conditions include that the wireless device obtains, from a network node, approval for conveying the at least part of the first message.

3. The method of claim 1, wherein the one or more conditions include that the wireless device does not receive a forth message including at least one of node identification information and service identification information embedded in the first message or the second message.

4. The method of claim 1, wherein the first message is a discovery related message including at least one of ping related information and advertisement related information, and the second message is a discovery related message including at least one of ping related information and advertisement related information.

5. The method of claim 1, wherein the third message includes time information related with reception time of the first message.

6. The method of claim 5, wherein the time information indicates a time difference between current time and the reception time of the first message.

7. The method of claim 1, wherein the third message includes location information for a corresponding service.

8. A wireless device configured to assist a discovery between hidden wireless nodes in a wireless communication system, the wireless device comprising:

a radio frequency (RF) unit; and a processor, wherein the processor is configured to:

receive, from a first wireless node, a first message including at least one of node identification information and service identification information;

receive, from a second wireless node, a second message including at least one of node identification information and service identification information;

convey, to the second wireless node, at least part of the first message through a third message when one or more conditions are met, wherein the third message includes counting information indicating how many hops the at least part of the first message is conveyed, wherein the one or more condition include that the service information in the first message is matched with the service information in the second message.

9. The wireless device of claim 8, wherein the one or more conditions include that the wireless device obtains, from a network node, approval for conveying the at least part of the first message.

10. The wireless device of claim 8, wherein the one or more conditions include that the wireless device does not receive a forth message including at least one of node identification information and service identification information embedded in the first message or the second message.

11. The wireless device of claim 8, wherein the first message is a discovery related message including at least one of ping related information and advertisement related information, and the second message is a discovery related message including at least one of ping related information and advertisement related information.

12. The wireless device of claim 8, wherein the third message includes time information related with reception time of the first message.

13. The wireless device of claim 12, wherein the time information indicates a time difference between current time and the reception time of the first message.

14. The wireless device of claim 8, wherein the third message includes location information for a corresponding service.

* * * * *